E. TUCKER.
Sugar Evaporator.
No. 40,870. Patented Dec. 8, 1863.
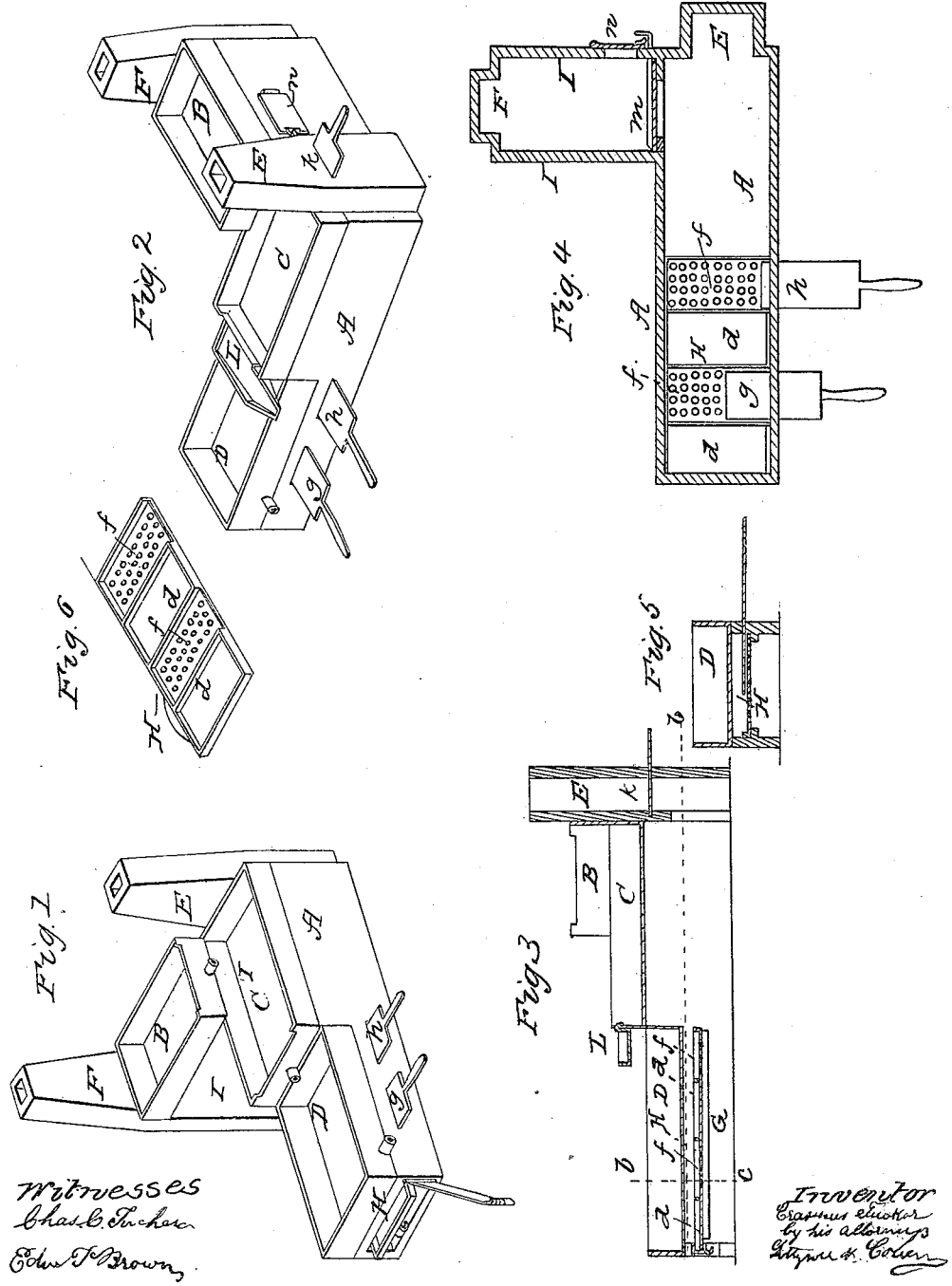

UNITED STATES PATENT OFFICE.

ERASMUS TUCKER, OF POPLAR GROVE, INDIANA.

IMPROVEMENT IN SUGAR-EVAPORATING APPARATUS.

Specification forming part of Letters Patent No. 40,870, dated December 8, 1863.

*To all whom it may concern:*

Be it known that I, ERASMUS TUCKER, of Poplar Grove, in the county of Howard and State of Indiana, have invented certain new and useful Improvements in Concentrating Saccharine Juice for the Manufacture of Sugar; and I do hereby declare that the following is a full, clear, and exact description of the construction and operation of the same, reference being had to the accompanying drawings, in which—

Figures 1 and 2 represent perspective views of said sugar-evaporator. Fig. 3 represents a longitudinal vertical section through the same. Fig. 4 represents a horizontal section through the same in the line $a\,b$. Fig. 5 represents a vertical section through the same on the line $b\,c$. Fig. 6 represents a detached view hereinafter to be referred to.

To enable others skilled in the art to make and use my invention, I will proceed to describe its construction and operation.

A represents the brick-work of the furnace which supports the evaporating-pans C D.

I represents the brick-work of the furnace which supports the pan B. The pans are arranged on different levels, the pan B, which receives the juice from the press, being on the highest level, while the pan D, in which the sirup is condensed to the crystallizing-point, is on the lowest level.

E and F represent chimneys for the escape of the smoke. I use two chimneys for the purpose of heating the pan B and the pans C D independently of each other, when such is desirable, as hereinafter described, in the operation of the apparatus; but the flues of the chimneys and of the furnaces are so arranged that all pans can be heated from one furnace.

G is the fire-place, from which the pans D C B may be heated simultaneously. The fire being below the last pan D, which contains the condensed sirup, it is necessary that said pan should be protected to prevent the sirup from burning. I effect this by means of a regulator, H, which is interposed between the fire and the bottom of the pan D, and which is shown in a detached perspective view in Fig. 6. It consists of two or more shallow pans, $d$, which contain water, and from which steam is generated by the action of the fire under it, and intermediate perforated plates, $f$, through which part of the gases and heated air of the fire can pass and unite with the steam of the pans $d$, and thus prevent the steam from condensing on the comparative cool bottom of the pan D by heating the steam and the pan D; but owing to the mixture of the gases and hot air with the steam, the sirup in the pan D is fully protected against being burned, to which it is liable when the fire is applied directly to heat the pan.

$g$ and $h$ represent dampers, which can be moved in and out so as to cover part or the entire surface of the perforated plates $f$, for the purpose of regulating the heat under the pan D, and for shutting off the heat altogether from said pan should such be found necessary.

$k$ represents a damper in the chimney E, and $m$ a damper in the furnace I. When the three pans are to be heated from the fire at G, the damper $k$ is closed, and the damper $m$ is opened, and the hot air from the fire at G passes under the three pans and escapes through the chimney F; but when the pans D and C only are to be heated, the damper $k$ is opened, the damper $m$ is closed, and the hot air and smoke escape through the chimney E. The pan B may be heated separately by introducing the fire through the door $n$ into the furnace I.

The operation of the apparatus is as follows: The pan B is filled with juice from the press, and no sirup being as yet in the pans C D, fire is introduced through the door $n$ into the furnace I, to heat the pan B only. The juice is heated, and as the scum is raised it is removed by means of a skimmer, and is thrown either into a pan, L, (represented in Figs. 2 and 3,) or into the second sugar-pan, C. The fire is now lighted at G, under the pan B, but the dampers $g$ and $h$ are closed to prevent said pan from becoming heated. The sirup is then let down from the pan B to pan C, through the spout 1. The damper $k$ is closed, the damper $m$ is opened, and the heat from the fire at G passes under the three pans, and escapes through chimney F, the pan B being again filled with juice. The sirup in pan C is skimmed, and the scum is passed into the scum-pan L, and when the sirup is sufficiently concentrated it is let down into the pan D, where it is condensed to the desired degree for crystallizing, and a good sirup is obtained, as the combined steam and hot air cannot burn the sirup, and as the heat can be regulated with great accuracy by means of the dampers $g\,h$.

I am aware that open steam-pans have been used under sugar-pans to protect the sirup from being scorched. These I do not claim, as they do not operate perfectly, because the steam condenses on the comparative cool bottom of the pan, and because the heat cannot be regulated.

Having thus fully described the nature of my invention, what I claim herein as new, and desire to secure by Letters Patent, is—

1. In combination with an evaporating-pan, an intermediate heat-regulator, H, consisting, substantially, of alternate shallow water-pans and perforated plates, when constructed and operated substantially in the manner and for the purposes described.

2. In combination with the intermediate heat-regulator, H, the dampers $g\,h$, for the purpose of regulating or shutting off the heat from the pan, substantially in the manner herein described.

3. In combination with the evaporating-pans set at different levels, the two chimneys E F and dampers $k\,m$, for the purpose of heating the first pan, B, independently of the others, substantially in the manner and for the purposes set forth.

ERASMUS TUCKER.

Witnesses:
 EDM. F. BROWN,
 E. COHEN.